United States Patent [19]

Itoh

[11] Patent Number: 5,649,215
[45] Date of Patent: Jul. 15, 1997

[54] LANGUAGE PARSING DEVICE AND METHOD FOR SAME

[75] Inventor: Hideo Itoh, Tokyo, Japan

[73] Assignee: Richo Company, Ltd., Tokyo, Japan

[21] Appl. No.: 371,798

[22] Filed: Jan. 12, 1995

[30] Foreign Application Priority Data

Jan. 13, 1994 [JP] Japan ................................. 6-002102

[51] Int. Cl.$^6$ ............................................ G06F 17/27
[52] U.S. Cl. ............................................ 395/759; 395/709
[58] Field of Search ................................ 395/759, 760, 395/792, 793, 794, 708, 709, 611, 612, 800, 421.1

[56] References Cited

U.S. PATENT DOCUMENTS

| 5,029,085 | 7/1991 | Itoh . | |
| 5,095,432 | 3/1992 | Reed | 395/759 |
| 5,105,353 | 4/1992 | Charles et al. | 395/709 |
| 5,193,192 | 3/1993 | Seberger | 395/709 |
| 5,388,234 | 2/1995 | Kanno et al. | 395/421.1 |
| 5,475,588 | 12/1995 | Schabes et al. | 395/759 |
| 5,511,213 | 4/1996 | Correa | 395/800 |

OTHER PUBLICATIONS

Tanaka, H. "Basics of Natural Language Parsing," Sangyo-Tosyo Publishers, 1989, pp. 83–104.

Tomita, M. "Efficient Parsing for Nartural Languages," Kluwer Academic Publishers, 1986, p. 33.

Primary Examiner—Jeffery Hofsass
Assistant Examiner—Andrew Hill
Attorney, Agent, or Firm—Oblon, Spivak, McClelland, Maier & Neustadt, P.C.

[57] ABSTRACT

A method for parsing of a language defined by context free grammar includes the steps of extracting groups corresponding to words of a sentence in an order of word arrangement of the sentence, each of the groups being formed by a terminal symbol, a start-position number, and an end-position number of a corresponding one of the words; creating a state list by using the groups, the context free grammar, and an LR table derived from the context free grammar, the state list corresponding to position numbers indicating positions of the words and including state numbers indicating state of the parsing; and carrying out the parsing while creating the state list.

7 Claims, 8 Drawing Sheets

FIG. 3

| GRAMMAR NUMBER | LEFT SIDE | RIGHT SIDE |
|---|---|---|
| 1 | S | P P  S |
| 2 | S | V |
| 3 | P P | N  P |
| 4 | P P | S  P |

FIG. 4

| STATE NUMBER | ACTION PART | | | | GOTO PART | |
|---|---|---|---|---|---|---|
| | N | P | V | $ | P P | S |
| 0 | sh4 | | sh3 | | 2 | 1 |
| 1 | | sh5 | | ACCEPTANCE | | |
| 2 | sh4 | | sh3 | | 2 | 6 |
| 3 | | re2 | | re2 | | |
| 4 | | sh7 | | | | |
| 5 | re4 | | re4 | | | |
| 6 | | sh5  re1 | | re1 | | |
| 7 | re3 | | re3 | | | |

| START-POSITION NUMBER | END-POSITION NUMBER | TERMINAL/NON-TERMINAL SYMBOL |
|---|---|---|
| 1 | 2 | N |
| 2 | 3 | P |
| 1 | 3 | P P |
| 3 | 4 | V |
| . | . | . |
| . | . | . |

FIG. 9

| POSITION NUMBER | STATE NUMBER |
|---|---|
| 1 | 0 |
| 2 | 4 |
| 3 | 2 |
| 3 | 4, 1, 6 |
| 4 | 2 |
| 5 | 1 |

FIG.10

LANGUAGE PARSING DEVICE AND METHOD FOR SAME

BACKGROUND OF THE INVENTION

1. Field of the Invention

The present invention generally relates to methods for language parsing and devices for the same, and particularly relates to a method for language parsing and a device for the same which extract constituents defined by a context free grammar with regard to terminal symbol strings.

2. Description of the Prior Art

In a syntactic parsing of natural languages, syntactic ambiguities arises as a problem. For example, there are two different interpretations for a single English phrase 'A of B of C', i.e., ((A of (B of C))) or (((A of B) of C)). Here, brackets indicate constituents (syntactic groups of words). When there are more than one syntax as in this example, those syntaxes are called syntactic ambiguities. As a length of a sentence becomes large, the number of syntactic ambiguities expands rapidly. The problem is that, when a syntactic parsing derives all possible syntaxes for a long sentence, a processing time and a memory volume required for processing become enormous, because of the syntactic ambiguities.

Methods of extracting all phrase structures as efficiently as possible have been proposed for such grammar as of natural languages, which involves syntactic ambiguities. One of such algorithms is proposed in Efficient Parsing for Natural language by M. Tomita, Kluwer Academic Publishers, 1985, p. 33. The algorithm of this reference augments the LR parsing developed for programming languages, which involves no syntactic ambiguities, so as to use it for natural languages, which involves syntactic ambiguities. This augmented LR parsing is called the general LR parsing, and can carry out parsing more efficiently than do the Earley's algorithm or the chart parsing, which do not use a LR table.

As for the LR parsing, reference may be made to Basics of Natural Language Parsing by Hozumi Tanaka, Sangyo-Tosyo Publishers, pp. 83–104, 1989. The LR parsing scans a sentence from the left (beginning of the sentence) to the right (end of the sentence) by using a stack, and carries out a deterministic parsing applying shift operations and reduce operations to the stack, while looking up information obtained from a stack state and from k words looked at ahead of schedule. The letter L of the LR parsing means a scan of a sentence from the left to the right, and the letter R means a right most derivation.

In the LR parsing, an LR table (LR parse table) is extracted from given LR grammar. The LR table is divided into two parts. One part is an ACTION part which defines a state to be selected for each occurrence of shift and defines a rule to be used for each occurrence of reduce. The other part is a GOTO part which defines a state to be selected upon each reduce operation.

In the prior art method, however, a stack called a graph-structured stack is used, which complicates the mechanism of the method. Also, an amount of data stored with this data structure becomes too large to be overlooked during the parsing. Furthermore, depending on the type of a language to be analyzed, there is a need to frequently create and purge data of this data structure. This leads to an efficiency of the processing time being reduced.

Accordingly, there is a need in the field of a syntactic parsing for a method and a device which can carry out an efficient and speedy language parsing by using an LR table with a simple mechanism using a small memory volume irrespective of the type of language.

SUMMARY OF THE INVENTION

Accordingly, it is a general object of the present invention to provide a method and a device which satisfy the need described above.

It is another and more specific object of the present invention to provide a method and a device which can carry out an efficient and speedy language parsing by using an LR table with a simple mechanism using a small memory volume irrespective of the type of language.

In order to satisfy the above object, a method for parsing of a language defined by context free grammar includes the steps of extracting groups corresponding to words of a sentence in an order of word arrangement of the sentence, each of the groups being formed by a terminal symbol, a start-position number, and an end-position number of a corresponding one of the words; creating a state list by using the groups, the context free grammar, and an LR table derived from the context free grammar, the state list corresponding to position numbers indicating positions of the words and including state numbers indicating state of the parsing; and carrying out the parsing while creating the state list.

Also, in order to satisfy the above object, a device for the parsing of a language defined by context free grammar includes an input unit storing groups each formed from a terminal symbol, a start position number, and an end position number corresponding to a word in a sentence; a grammar unit storing the context free grammar; an operation table unit storing an LR table derived from the context free grammar; a state list unit storing a state list corresponding to position numbers indicating positions of words of the sentence and including state numbers indicating state of the parsing; and an parsing unit carrying out the parsing while creating the state list by using the groups, the context free grammar, and the LR table.

The present invention carries out parsing by using the LR table, and, thus, is capable of a more efficient parsing than the Earley's algorithm or the chart parsing. Also, since one-dimensional lists of numbers are used, the mechanism of the present invention is simpler in comparison with use of a graph-structured stack, which is a multi-dimensional graph. Furthermore, an amount of memory volume required for the parsing is smaller than the use of a graph-structured stack, because memory use in the present invention is limited to one-dimensional lists of numbers.

Other objects and further features of the present invention will be apparent from the following detailed description when read in conjunction with the accompanying drawings.

DESCRIPTION OF THE PREFERRED EMBODIMENTS

In the following, embodiments of the present invention will be described.

Figure 1:
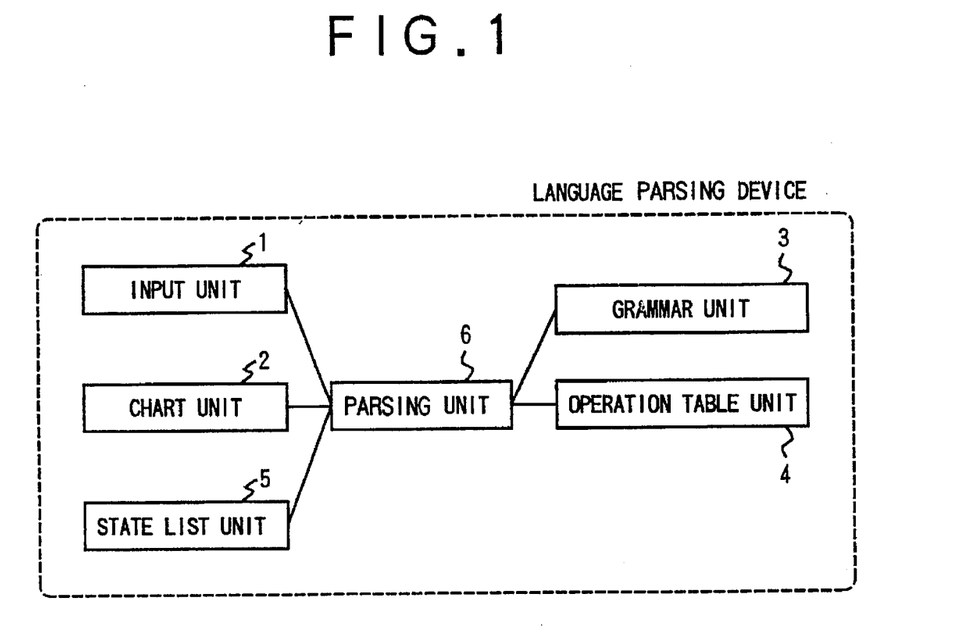
FIG. 1 is a block diagram of a first embodiment of a language parsing device according to the present invention.

FIG. 1 shows a block diagram of a first embodiment of a language parsing device according to the present invention. In the figure, the language parsing device includes an input unit 1, a chart unit 2, a grammar unit 3, an operation table unit 4, a state list unit 5, and an parsing unit 6.

The language parsing device of the present invention stores and utilizes a list of state numbers each assigned to a corresponding position number. Each unit of the language parsing device has a function as follows. The input unit 1 stores a phrase structure which includes terminal symbols and pairs of position numbers. The chart unit 2 stores phrase structures, each of which includes either a terminal symbol or a non-terminal symbol and two position numbers. The grammar unit 3 stores context free grammar, and the operation table unit 4 stores an LR table. The state list unit 5 stores a list of state numbers for each position number. The parsing unit 6 extracts phrase structures defined by the context free grammar with regard to a terminal symbol string.

An operation of the language parsing device of the present invention will be described below.

The following Japanese sentence is taken as an example, and the following context free grammar (called grammar J) is employed to carry out a syntactic parsing of the sentence.

Sentence: Bunka ga kita kara tsutawatta.

Grammar J:
    S→PP S
    S→V
    PP→N P
    PP→S P Here, S represents a sentence, V represents a verb, N represents a noun, P represents a postpositional word functioning like prepositions in English, and PP represents a noun phrase with a postpositional word. (In the Japanese language, a postpositional word often serves as an equivalent to a preposition in the English language when added to an object word, and often serves to indicate a subject word when added to a subject word.) The first word 'bunka' is a noun meaning 'culture' the second word 'ga' is a postpositional word indicating that the preceding word is a subject, the third word 'kita' is a noun meaning 'north' or is a verb meaning 'came', the fourth word 'kara' is a postpositional word equivalent to a preposition 'from' or to a conjunction 'because' and the last word 'tsutawatta' is a verb meaning 'was transplanted'. Thus, the above sentence can be translated into either 'A culture was transplanted from the north' or 'A culture was transplanted because it came'.

Terminal symbols are assigned to each word of the sentence as shown in TABLE 1.

TABLE 1

| Word | Terminal Symbol |
| --- | --- |
| bunka | N |
| ga | P |
| kita | N and V |
| kara | P |
| tsutawatta | V |

Also, in order to express positional relations between the terminal symbols, position numbers are assigned as identifications to each space between the words as shown in TABLE 2.

TABLE 2

| Bunka ga kita kara tsutawatta. | | | | | | |
| --- | --- | --- | --- | --- | --- | --- |
| position number | 1 | 2 | 3 | 4 | 5 | 6 |

Figure 2:
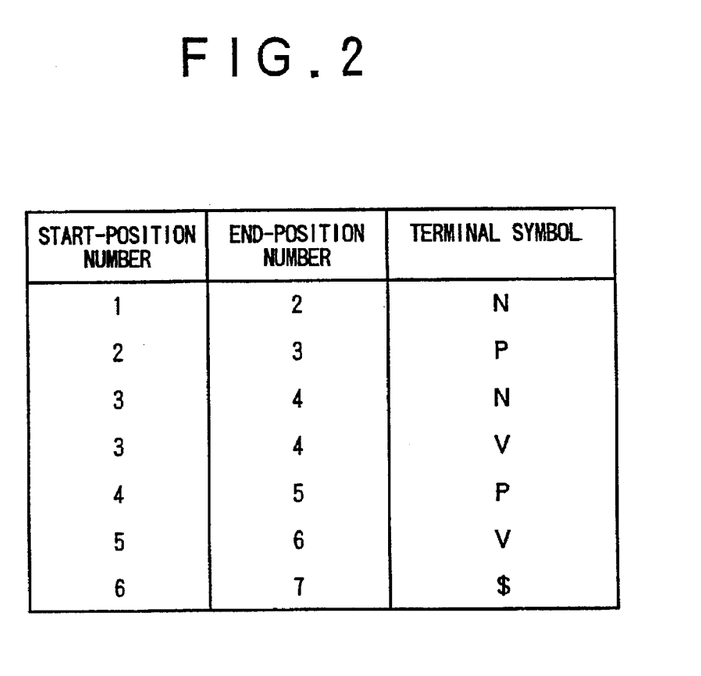
FIG. 2 is a diagram showing an example of contents stored in an input unit of FIG. 1.

Using those positioning numbers, the input unit 1 of FIG. 1 stores information shown in FIG. 2. In FIG. 2, a start-position number and an end-position number are two position numbers assigned to a space preceding a word corresponding to a terminal symbol and to a space following that word, respectively. Terminal symbols are stored in an ascending order of numbers.

As shown in FIG. 2 and TABLE 2, a start-position number for the first terminal symbol N is a positioning number which is assigned to the space in the left of of (preceding) the corresponding word 'bunka', i.e., the start-position number is 1. Here, a symbol '$' is a terminal symbol indicating the end of the sentence, and is added to the end.

Figure 3:
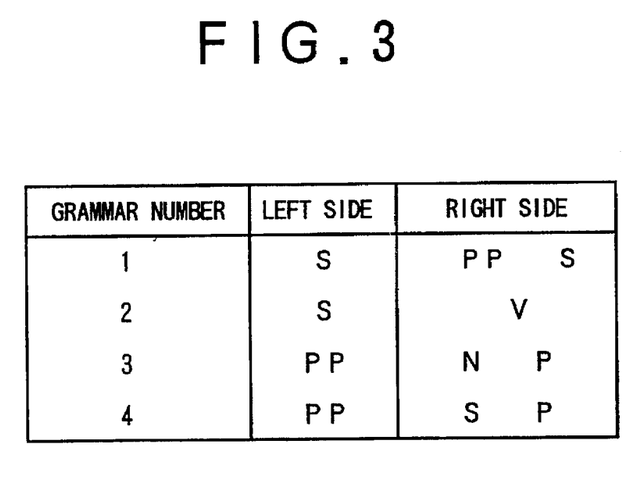
FIG. 3 is a diagram showing an example of contents stored in a grammar unit of FIG. 1.
Figure 4:
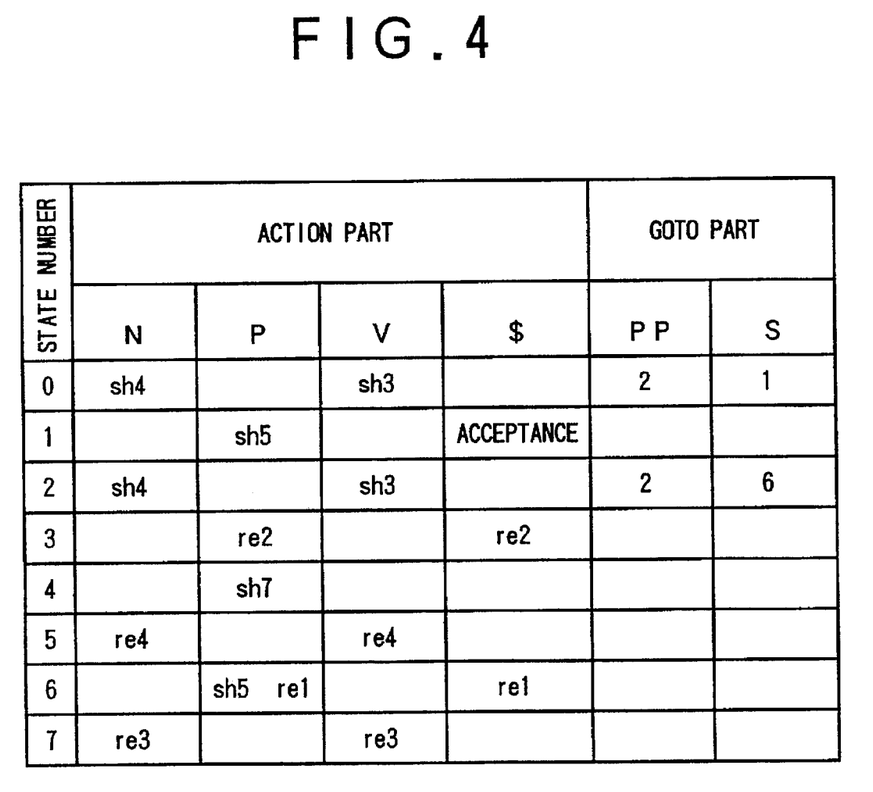
FIG. 4 is a diagram showing an example of contents stored in an operation table unit of FIG. 1.

The grammar J is stored in the grammar unit 3 of FIG. 1 as shown in FIG. 3. As shown in FIG. 3, the grammar J is stored such that the left-hand side and the right-hand side are stored separately along with the grammar numbers serving as a grammar identification. An LR table derived from the grammar J is stored in the operation table unit 4 of FIG. 1 as shown in FIG. 4. Contents of the LR table is the same as those of a conventional LR table. Namely, the LR table stores actions to be taken in response to a resulting state of the parsing. Here, states are identified by state numbers.

There are three types of actions to be taken, i.e., a state transition, an application of grammar, and an acceptance. A state transition from a state indicated by a state number n to a state indicated by a state number m via a given terminal symbol is indicated by 'sh m' stored in the ACTION part in a row of the state number n and in a column of the given terminal symbol number. A state transition via a given non-terminal symbol from a state indicated by a state number n to a state indicated by a state number m is indicated by 'm' stored in the GOTO part in a row of the state number n and in a column of that given non-terminal symbol number. Applying a grammar rule indicated by a grammar number g to a next terminal symbol at a current state number n is indicated by 're g' stored in the ACTION part in a row of the state number n and in a column of the next terminal symbol number. In the case of accepting the sentence when a current state is n and a next terminal symbol is $, 'acceptance' is stored in the ACTION part in a row of the state number n and in a column of $.

Schematics of an operation of the parsing unit 6 in FIG. 1 will be described below.

Figure 8:
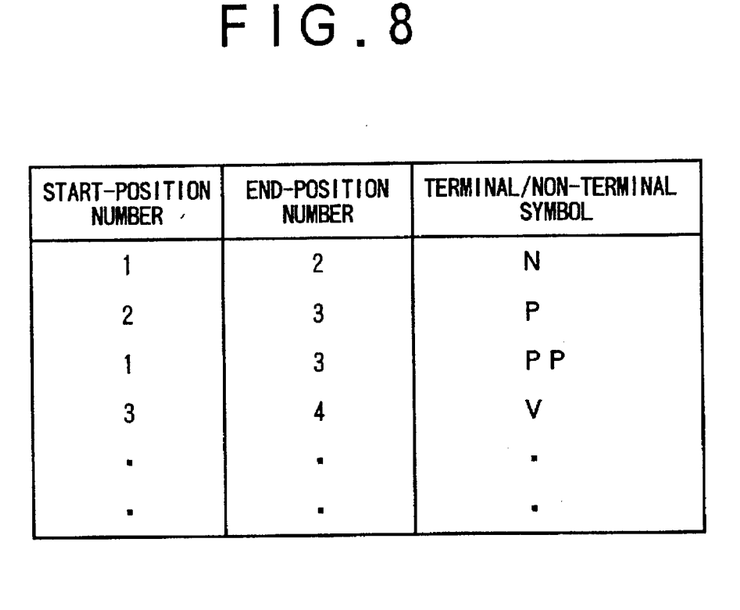
FIG. 8 is a diagram showing an example of contents stored in a chart unit of FIG. 1.
Figure 9:
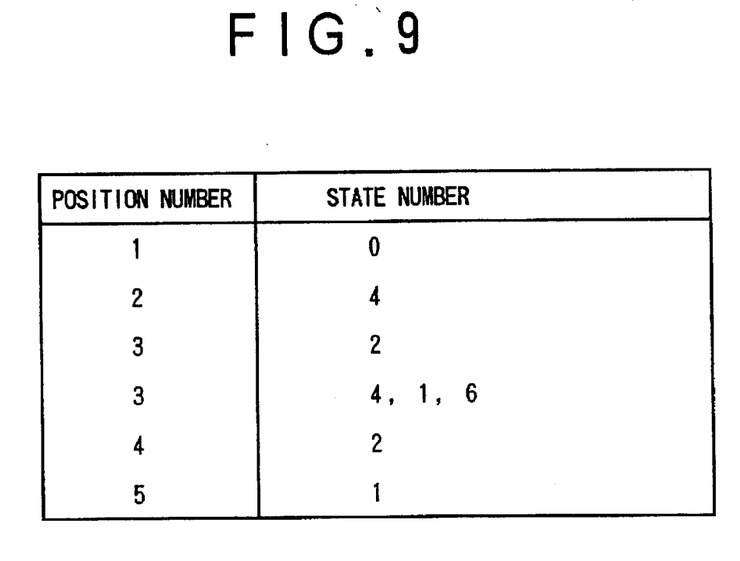
FIG. 9 is a diagram showing an example of contents stored in a state list unit of FIG. 1.

Terminal symbols stored in the input unit 1 are taken out one by one from the top, and are subject to operations shown in FIG. 5 to FIGS. 7A and 7B. Results of those operations are stored in the chart unit 2 in a manner shown in FIG. 8 and stored in the state list unit 5 in a manner shown in FIG. 9. The fact that the sentence is accepted in the end means that the sentence is in accordance with the grammar. In the chart unit 2 are stored all phrase structures which are evaluated in accordance with the grammar.

FIG. 5 to FIGS. 7A and 7B show flow charts for explaining operations of the parsing unit 6. In the following, each flow chart will be explained step by step.

Figure 5:
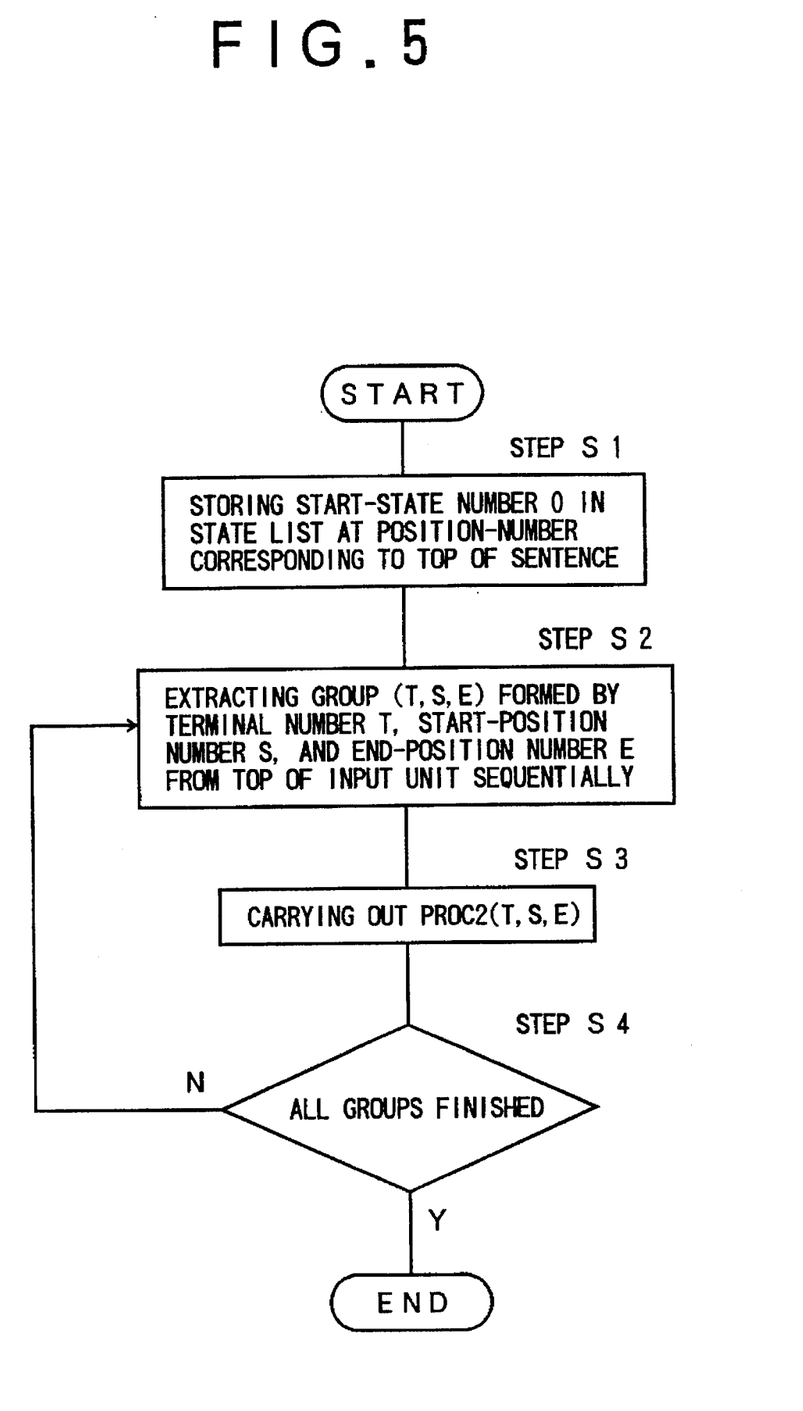
FIG. 5 is a flow chart of a first part of a procedure carried out by an parsing unit of the language parsing device.

FIG. 5 is a flow chart of a procedure PROC1.

At a step S1, a start state number is stored at a position number 1 indicating the beginning of the sentence as shown in TABLE 3. The start state number which is created at the time of creating an LR table is set to 0 in this case.

TABLE 3

| bunka ga kita kara tsutawatta. | | | | | | | |
|---|---|---|---|---|---|---|---|
| Input Unit | | | | | | | |
| position number | 1 | 2 | 3 | 4 | 5 | 6 | 7 |
| terminal symbol | N | P | N<br>V | P | V | $ | |
| State List Unit | | | | | | | |
| position number | 1 | | | | | | |
| state number | 0 | | | | | | |

At a step S2, groups each formed by a terminal symbol and its start and end-position numbers are taken out from the input unit 1 in an ascending order of the start-position numbers. At a step S3, a procedure PROC2 is carried out. At a step S4, a check is made whether all the groups have been processed. If they have, this is the end of the procedure PROC1. If all the groups are not processed, the procedure goes back to the step S2.

Figure 6:
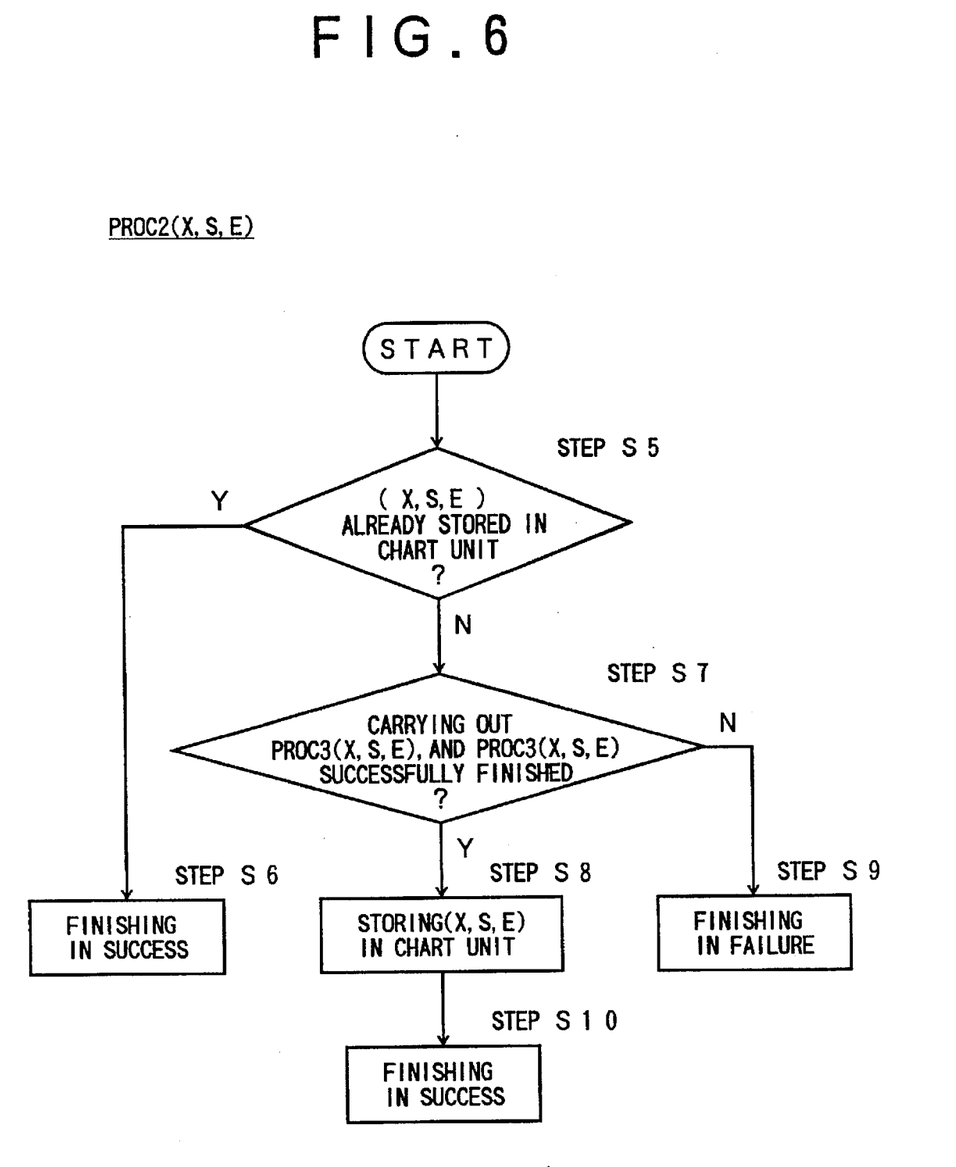
FIG. 6 is a flow chart of a second part of a procedure carried out by an parsing unit of the language parsing device.

FIG. 6 is a flow chart of the procedure PROC2.

The first group taken out from the input unit 1 at the step S2 of the procedure PROC1 is (N, 1, Thus, PROC2(N, 1, 2) is carried out first.

At a step S5, a check is made whether the group (N, 1, 2) is stored in the chart unit 2 as a phase structure. If it is, this is the end of the procedure PROC2 at a step S6. If the group (N, 1, 2) is not stored in the chart unit 2 (this is surely the case in this example since this group is the first group), a procedure PROC3(N, 1, 2) is carried out at a step S7.

Also, at the step S7, a check is made whether the procedure PROC3 is successfully finished. If it is not, the procedure PROC2 is finished in failure at a step S9. If the procedure PROC3 succeeds, the procedure PROC2 proceeds to a step S8. At the step S8, the group being processed is stored in the chart unit 2. At a step S10, the procedure is completed in success.

Figure 7A:
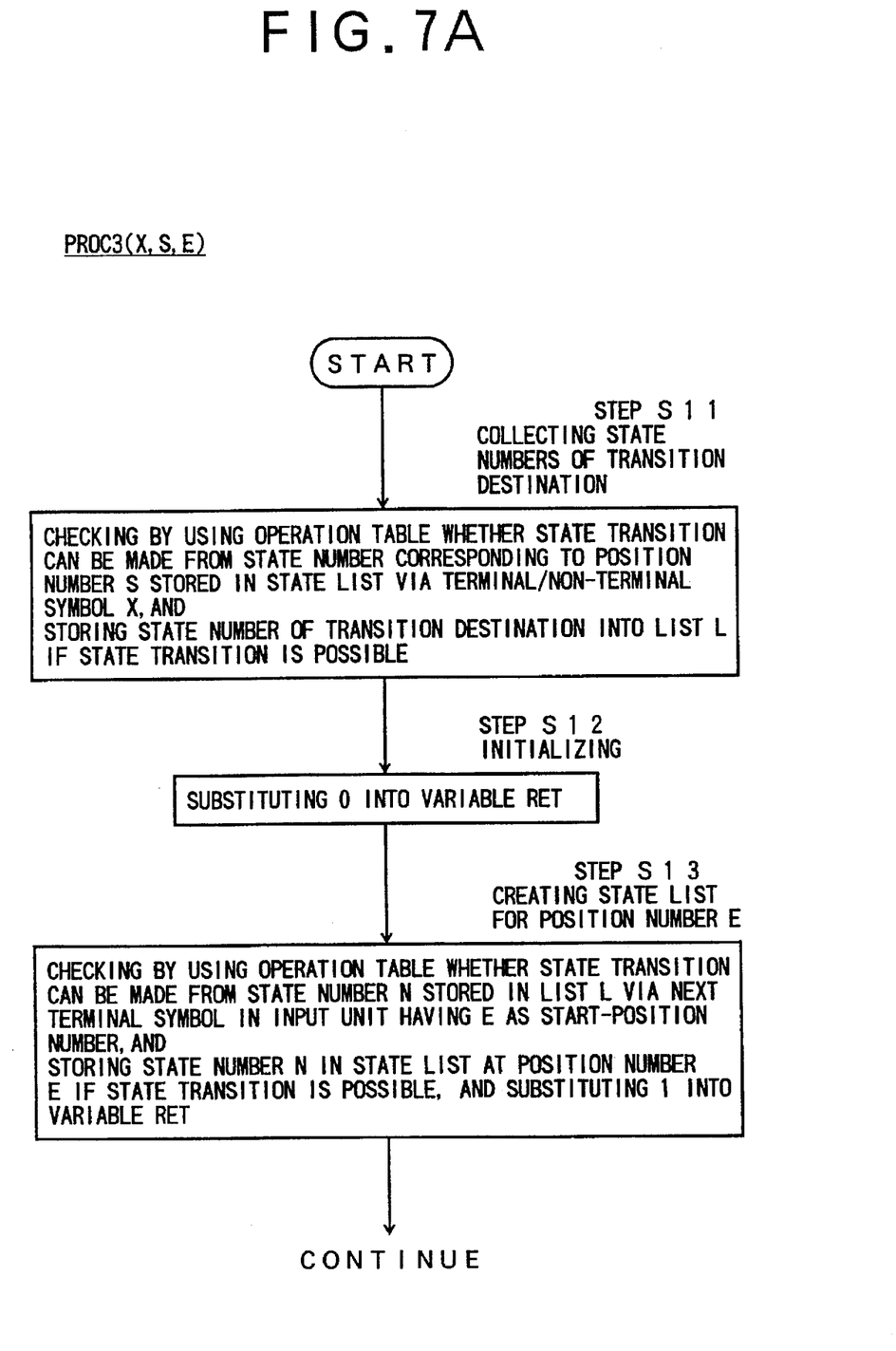
FIGS. 7A and 7B are a flow chart of a third part of a procedure carried out by an parsing unit of the language parsing device.
Figure 7B:
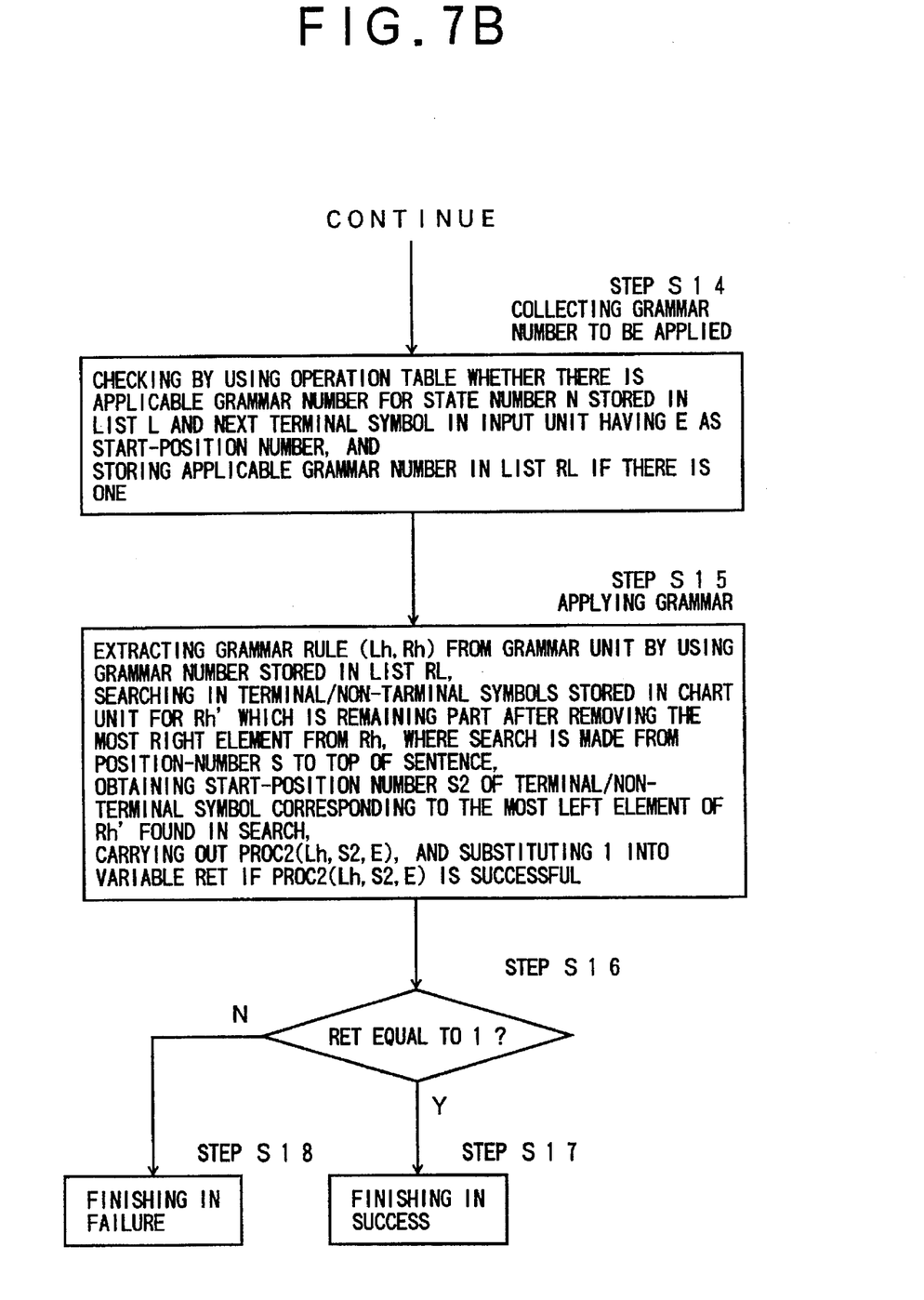

FIGS. 7A and 7B are a flow chart of the procedure PROC3. Here, the first group (N, 1, 2) is processed first.

At a step S11, a state list of a position number 1 is taken out. As shown in TABLE 3, the state number of the position number 1 is 0, which is thus taken out. Then, a state transition for the terminal symbol N and the state number 0 is looked up in the operation table of FIG. 4. In this case, the state transition is indicated by 'sh 4' so that a transition destination is a state number 4. Thus, 4 is added to a list L, resulting in L=[4]

At a step S12, a flag 0 is set in a variable Ret.

At a step S13, a state transition from the state number 4 of the list L via a terminal symbol P having a start-position number 2 is looked up in the operation table of FIG. 4. In this case, the state transition is possible as indicated by 'sh 7', so that the state number 4 is stored in the state list unit 5 at a position number 2. Also, a flag 1 is set in a variable Ret.

At a step S14, a grammar number applicable to the next terminal symbol P having a start-position number 2 when the state number of the list L is 4 is looked up in the operation table of FIG. 4. In this case, there is no applicable grammar. Thus, a RL list becomes a null list [ ].

At a step S15, no action is taken since the list RL is null.

At a step S16, a check is made whether the variable Ret is 1. In this case, it is 1, so that the procedure PROC3(N, 1, 2) is successfully finished at a step S17. This means returning to the procedure PROC2.

At this point, the state list unit 5 is as shown in TABLE 4.

TABLE 4

| Bunka ga kita kara tsutawatta. | | | | | | | |
|---|---|---|---|---|---|---|---|
| Input Unit | | | | | | | |
| position number | 1 | 2 | 3 | 4 | 5 | 6 | 7 |
| terminal symbol | N | P | N<br>V | P | V | $ | |
| State List Unit | | | | | | | |
| position number | 1 | 2 | | | | | |
| state number | 0 | 4 | | | | | |

With reference to FIG. 6 again, since the procedure PROC3(N, 1, 2) turns out to be successful at the step S7, the group (N, 1, 2) is stored in the chart unit 2 at the step S8. At the step S10, the procedure PROC2(N, 1, 2) is successfully finished.

At this point, the state list unit 5 and the chart unit 2 are as shown in TABLE 5.

TABLE 5

| Bunka ga kita kara tsutawatta. | | | | | | | |
|---|---|---|---|---|---|---|---|
| Input Unit | | | | | | | |
| position number | 1 | 2 | 3 | 4 | 5 | 6 | 7 |
| terminal symbol | N | P | N<br>V | P | V | $ | |
| State List Unit | | | | | | | |
| position number | 1 | 2 | | | | | |
| state number | 0 | 4 | | | | | |
| Chart Unit | | | | | | | |
| (symbol, start, end) | (N, 1, 2) | | | | | | |

With reference to FIG. 5 again, since it turns out at the step S4 that all the groups are not yet processed, the procedure PROC1 goes back to the step S2. At the step S2, the next group (P, 2, 3) is taken out. At the step S3, a procedure PROC2(P, 2, 3) is carried out.

With reference to FIG. 6 again, a check is made at the step S5 whether the group (P, 2, 3) is already stored in the chart unit 2 as a phrase structure. Since it is not stored, a procedure PROC3(P, 2, 3) is carried out at the step S7.

With reference to FIGS. 7A and 7B again, at the step S11, a state list of a position number 2 is taken out. As shown in TABLE 3, the state number of the position number 2 is 4, which is thus taken out. Then, a state transition for the terminal symbol P and the state number 4 is looked up in the operation table of FIG. 4. In this case, the state transition is indicated by 'sh 7' so that a transition destination is a state number 7. Thus, 7 is added to a list L, resulting in L=[7].

At a step S12, a flag 0 is set in a variable Ret.

At a step S13, a state transition from the state number 7 of the list L via terminal symbols V and N having a start-position number 3 is looked up in the operation table of FIG. 4. In this case, there is no possible state transition for either V or N, so that no further action is taken.

At a step S14, a grammar number applicable to the next terminal symbols V and N having a start-position number 3 when the state number of the list L is 7 is looked up in the operation table of FIG. 4. In this case, 're 3' is found as an applicable grammar for both V and N, thus resulting in the RL list being RL=[3].

At a step 15, a grammar rule (PP, [N, P]) which is indicated by the grammar number 3 of the RL list is taken out from the grammar unit 3. (Here, the left hand side in a grammar rule is indicated by Lh and the right hand side by Rh.) Then, a search is made in the phase structures stored in the chart unit 2 for Rh'=[N], which is a remaining part after removing the most right element P from Rh=[N, P]. The search is made from the position number 2 to the beginning of the sentence. As a result, [N] is found in the phase structure (N, 1, 2). It turns out that the found grammar symbol N has a start-position number 1. Thus, a procedure PROC2(PP, 1, 3) is carried out.

With reference to FIG. 6 again, since it is checked at the step S5 that the group (PP, 1, 3) is not stored in the chart unit 2, a procedure PROC3(PP, 1, 3) is carried out at the step S7.

With reference to FIGS. 7A and 7B again, at a step 11, a state list of a position number 1 is taken out. As shown in TABLE 5, the state number of the position number 1 is 0, which is thus taken out. Then, a state transition for the non-terminal symbol PP and the state number 0 is looked up in the operation table of FIG. 4. In this case, the state transition is indicated by '2' in the GOTO part, so that a transition destination is a state number 2. Thus, 2 is added to a list L, resulting in L=[2]

At a step S12, a flag 0 is set in a variable Ret.

At a step S13, a state transition from the state number 2 of the list L via a terminal symbol V and N having a start-position number 3 is looked up in the operation table of FIG. 4. In this case, the state transition is possible as indicated by 'sh 3' and 'sh 4' for V and N, respectively. Thus, the state number 2 is stored in the state list unit 5 at a position number 3. Also, a flag 1 is set in a variable Ret.

At a step S14, a grammar number applicable to the next terminal symbols V and N having a start-position number 3 when the state number of the list L is 2 is looked up in the operation table of FIG. 4. In this case, there is no applicable grammar. Thus, a RL list becomes a null list [ ].

At a step 15, no action is taken since the list RL is null.

At a step S16, a check is made whether the variable Ret is 1. In this case, it is 1, so that the procedure PROC3(PP, 1, 3) is successfully finished at a step S17. This means returning to the procedure PROC2(P, 2, 3).

With reference back to FIG. 6, since the procedure PROC3(PP, 1, 3) is successfully finished, the group (PP, 1, 3) is stored in the chart unit 2 at the step S8. At the step S10, the procedure PROC2(PP, 1, 3) is completed in success. This means returning to the procedure PROC3(P, 2, 3).

Referring to FIGS. 7A and 7B again, at the step S15, the procedure PROC2(PP, 1, 3) turns out to be successful so that the variable Ret is set to 1.

At the step S16, it is checked that the variable Ret is 1. At the step S17, the procedure PROC3(P, 2, 3) is finished successfully. This means returning to the procedure PROC2 (P, 2, 3).

At this point, the state list unit 5 and the chart unit 2 are as shown in TABLE 6.

TABLE 6

| Bunka ga kita kara tsutawatta. | | | | | | | |
|---|---|---|---|---|---|---|---|
| Input Unit | | | | | | | |
| position number | 1 | 2 | 3 | 4 | 5 | 6 | 7 |
| terminal symbol | N | P | N V | P | V | $ | |
| State List Unit | | | | | | | |
| position number | 1 | 2 | 3 | | | | |
| state number | 0 | 4 | 2 | | | | |
| Chart Unit | | | | | | | |
| (symbol, start, end) | (N, 1, 2) (PP, 1, 3) | | | | | | |

With reference to FIG. 6 again, since the procedure PROC3(P, 2, 3) turns out to be successful at the step S7, the group (P, 2, 3) is stored in the chart unit 2 at the step S8. At the step S10, the procedure PROC2(P, 2, 3) is successfully finished.

At this point, the state list unit 5 and the chart unit 2 are as shown in TABLE 7.

TABLE 7

| Bunka ga kita kara tsutawatta. | | | | | | | |
|---|---|---|---|---|---|---|---|
| Input Unit | | | | | | | |
| position number | 1 | 2 | 3 | 4 | 5 | 6 | 7 |
| terminal symbol | N | P | N V | P | V | $ | |
| State List Unit | | | | | | | |
| position number | 1 | 2 | 3 | | | | |
| state number | 0 | 4 | 2 | | | | |
| Chart Unit | | | | | | | |
| (symbol, start, end) | (N, 1, 2) (PP, 1, 3) (P, 2, 3) | | | | | | |

For the remaining groups stored in the input unit 1, the same procedure is carried out. As a consequence, the state list unit 5 and the chart unit shown in TABLE 8 are obtained with the acceptance of the sentence.

TABLE 8

| Bunka ga kita kara tsutawatta. | | | | | | | |
|---|---|---|---|---|---|---|---|
| Input Unit | | | | | | | |
| position number | 1 | 2 | 3 | 4 | 5 | 6 | 7 |
| terminal symbol | N | P | N V | P | V | $ | |

TABLE 8-continued

Bunka ga kita kara tsutawatta.

State List Unit

| position number | 1 | 2 | 3 | 4 | 5 | 6 |
|---|---|---|---|---|---|---|
| state number | 0 | 4 | 2 | 6<br>4<br>1 | 2 | 1 |

Chart Unit (symbol, start, end)   (N, 1, 2)
(PP, 1, 3)
(P, 2, 3)
(S, 3, 4)
(V, 3, 4)
(N, 3, 4)
(PP, 3, 5)
(P, 4, 5)
(S, 1, 4)
(S, 3, 4)
(PP, 1, 5)
(S, 1, 6)
(S, 3, 6)
(S, 5, 6)

As a final result, a total number of fourteen phrase structures are extracted, and stored in the chart unit 2 as shown in TABLE 8.

Figure 10:
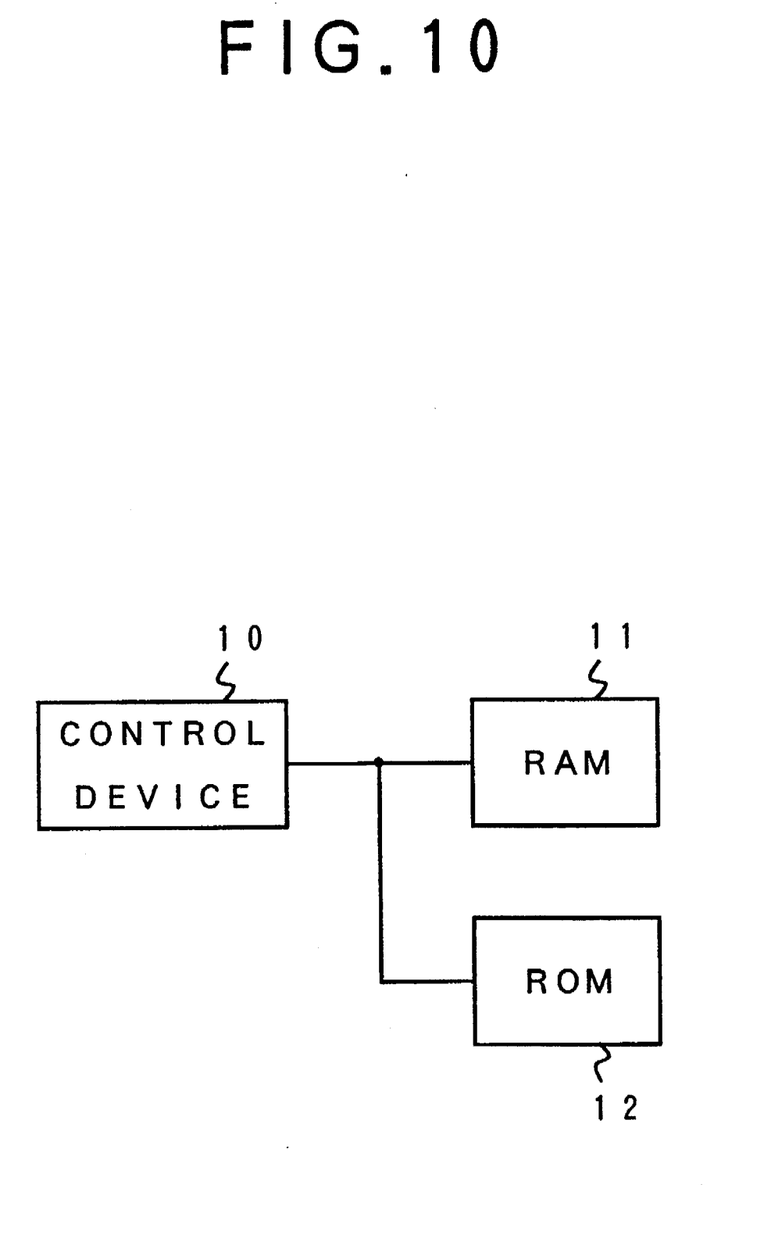
FIG. 10 is a block diagram of a second embodiment of a language parsing device according to the present invention.

FIG. 10 shows a block diagram of a second embodiment of a language parsing device according to the present invention. In the figure, the language parsing device includes a control device 10 such as a CPU (central processing unit), a RAM 11, and a ROM 12.

The control device 10 carries out the syntactic parsing described above by using control programs stored in the ROM 12. The RAM 11 stores the same data as those of the first embodiment. Namely, the RAM 11 stores the groups each formed from a terminal symbol, a start position number, and an end position number. Also, the RAM 11 stores the context free grammar J, the state list and the constituents (phrase structures) as results of the parsing, and the LR table derived from the grammar J.

Thus, the second embodiment can carry out the same syntactic parsing as that of the first embodiment.

The above embodiments have been described by taking a Japanese sentence as an example. However, the present invention can be applied to other natural languages such as English and French and programming languages such as C. Although the above embodiments are concerned with a syntactic parsing, it is effective for such parsing as a morphological parsing or a semantic parsing. In short, the present invention can be applied to the various parsing of languages described by context free grammar. In the following, context free grammar used for a morphological parsing of the English language is shown as an example.

S→WS PRD
WS→WS DLM Word
WS→Word

Here, S represents a sentence, WS represents a word series, PRD represents a period (end-of-sentence), DLM represents a delimiter, and Word represents a word. The context free grammar shown above describes that an English sentence is a series of words separated by delimiters.

In the above description, the present invention has been described by taking as an example its application to a syntactic parsing of a natural language. However, the present invention can be applied to the various parsing of languages defined by context free grammar. Although the above embodiments have been described with regard to an parsing made from the top of a sentence to the end, an parsing can be made from the end to the top of a sentence by modifying the LR table used in the above embodiments.

As shown in the above description, the present invention carries out parsing by using the LR table, and, thus, is capable of a more efficient parsing than the Earley's algorithm or the chart parsing. Also, since one-dimensional lists of numbers are used, the mechanism of the present invention is simpler in comparison with use of a graph-structured stack, which is a multi-dimensional graph. Furthermore, an amount of memory volume required for the parsing is smaller than with the use of a graph-structured stack, because memory use in the present invention is only limited to one-dimensional lists of numbers.

Further, the present invention is not limited to these embodiments, but various variations and modifications may be made without departing from the scope of the present invention.

What is claimed is:

1. A method for parsing of a language defined by context free grammar, said method comprising the steps of:

extracting groups corresponding to words of a sentence in an order of word arrangement of said sentence, each of said groups being formed by a terminal symbol, a start-position number, and an end-position number of a corresponding one of said words;

creating a state list by using said groups, said context free grammar, and an LR table derived from said context free grammar, said state list corresponding to position numbers indicating positions of said words and including state numbers indicating state of said parsing; and carrying out said parsing while creating said state list.

2. The method as claimed in claim 1, wherein said step of carrying out said parsing comprises a step of extracting from said sentence constituents defined by said context free grammar by creating a chart of phrase structures.

3. The method as claimed in claim 2, wherein said step of extracting said groups comprises a step of extracting said groups in a reverse order of said word arrangement.

4. A device for parsing of a language defined by context free grammar, said device comprising:

an input unit storing groups each formed from a terminal symbol, a start position number, and an end position number corresponding to a word in a sentence;

a grammar unit storing said context free grammar;

an operation table unit storing an LR table derived from said context free grammar;

a state list unit storing a state list corresponding to position numbers indicating positions of words of said sentence and including state numbers indicating state of said parsing; and an parsing unit carrying out said parsing while creating said state list by using said groups, said context free grammar, and said LR table.

5. The device as claimed in claim 4, further comprising a chart unit storing constituents, each of which includes a start position number, an end position number, and either a terminal symbol or a non-terminal symbol, wherein said parsing unit extracts from said sentence said constituents defined by said context free grammar by creating a chart of phrase structures.

6. A device for parsing of a language defined by context free grammar, said device comprising:

a control unit carrying out said parsing;

a ROM storing control programs controlling said control unit; and a RAM storing:

said context free grammar;

an LR table derived from said context free grammar;

groups each formed from a terminal symbol, a start position number, and an end position number corresponding to a word in a sentence; and a state list corresponding to position numbers indicating positions of words of said sentence and including state numbers indicating state of said parsing, wherein said control unit carries out said parsing while creating said state list by using said groups, said context free grammar, and said LR table.

7. The device as claimed in claim 6, wherein said RAM further stores constituents, each of which includes a start position number, an end position number, and either a terminal symbol or a non-terminal symbol, wherein said control unit extracts from said sentence said constituents defined by said context free grammar by creating a chart of phrase structures.

* * * * *

UNITED STATES PATENT AND TRADEMARK OFFICE
CERTIFICATE OF CORRECTION

PATENT NO.   : 5,649,215
DATED        : July 15, 1997
INVENTOR(S)  : Hideo ITOH

It is certified that error appears in the above-indentified patent and that said Letters Patent is hereby corrected as shown below:

On the title page, item [73], should read:

--[73] Assignee:  Ricoh Company, Ltd., Tokyo, Japan--

Signed and Sealed this

Sixteenth Day of September, 1997

Attest:

BRUCE LEHMAN

Attesting Officer

Commissioner of Patents and Trademarks